Figure 1:
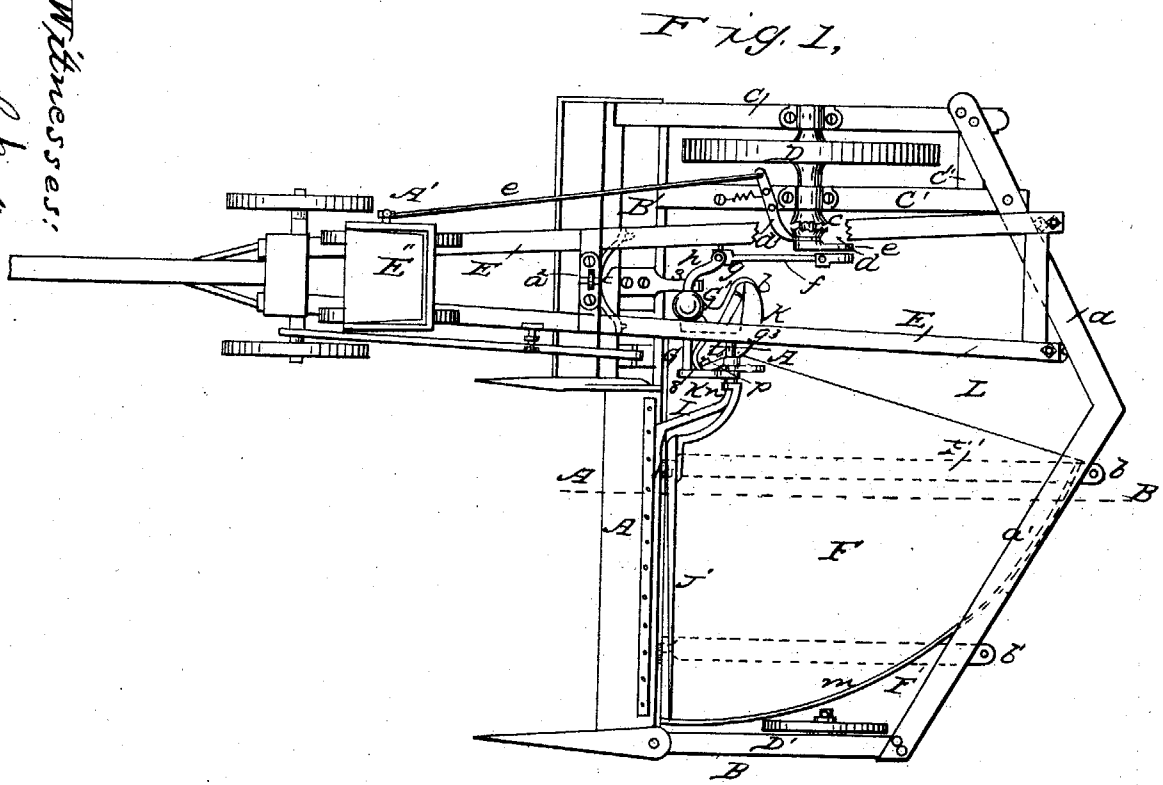

BEST AVAILABLE COPY

2 Sheets—Sheet 1.

G. ESTERLY.

Harvester.

No. 3,955.

Reissued May 3, 1870.

Witnesses:

S. B. Mleary

Fenton Moore

Inventor:

J. F. Luberling

N. PETERS, Photo-Lithographer, Washington, D. C.

2 Sheets—Sheet 2.
G. ESTERLY.
Harvester.
No. 3,955.
Reissued May 3, 1870.
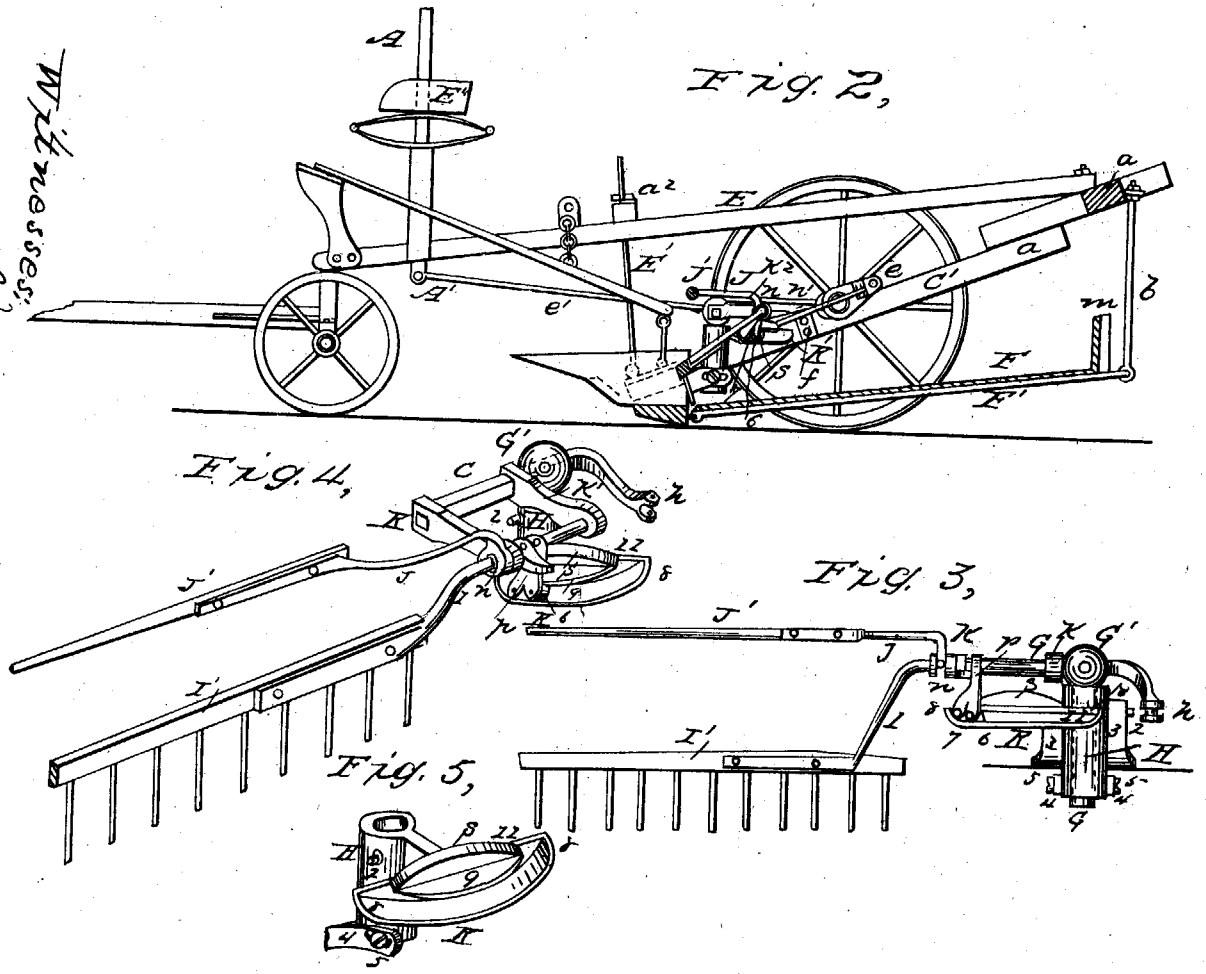
Witnesses:
S. B. Meary
Milton Shove
Inventor
J. F. Luberling
N. PETERS, Photo-Lithographer, Washington, D. C.

UNITED STATES PATENT OFFICE.

JOHN F. SEIBERLING, OF AKRON, OHIO, ASSIGNEE OF GEORGE ESTERLY.

IMPROVEMENT IN HARVESTERS.

Specification forming part of Letters Patent No. 23,666, dated April 19, 1859; Reissue No. 3,955, dated May 3, 1870.

*To all whom it may concern:*

Be it known that GEORGE ESTERLY, of Whitewater, in the county of Walworth and State of Wisconsin, heretofore invented a new and Improved Combined Automatic Rake and Harvester; and I do hereby declare that the following is a full, clear, and exact description of that part of said ESTERLY'S invention which forms the subject-matter of this division of reissue, reference being had to the annexed drawings making a part of this specification, in which—

Figure 1 represents a top or plan view of said ESTERLY'S combined automatic rake and harvester, a part of the frame being shown broken away. Fig. 2 represents a section on line A B, Fig. 1. Fig. 3 represents a back view of the automatic rake detached. Fig. 4 represents a perspective view of the automatic rake detached; and Fig. 5 represents a perspective view of the rake-guiding camways and post or tubular stand which supports the vertical rake-shaft, as will be hereinafter explained.

To enable those skilled in the art to make and use the said ESTERLY'S combined automatic rake and harvester, I will proceed to describe the same more in detail.

The nature of that part of said ESTERLY'S invention which forms the subject-matter of this division of reissue consists, first, in the combination, with the bent or crooked arm which is attached to and supports and carries the head of the rake-teeth in an automatic-raking harvester, of a short downwardly-projecting arm provided with a roll and a stationary projecting rib for holding the rake to the platform while the cut stalks of grain are being moved therefrom to form a gavel, as hereinafter described; second, in the combination, with an adjustable grain-platform, of an adjustable automatic rake, substantially as and for the purposes hereinafter explained; third, in the combination, with the bent arm G *h*, arranged in respect to journals 2 2 as hereinafter described, of a double-hinged connection-piece, *f*, for operating the same, and arranged in respect to the main driving-wheel substantially as and for the purposes hereinafter set forth; fourth, in the combination, with the spindle which supports the rake, of an adjustable socket or bearing piece, substantially as and for the purposes hereinafter explained; fifth, in the combination, with the bent or crooked arm which supports the rake-head and teeth in an automatic-raking harvester, of a short projecting guide-arm, a horizontally-projecting rib for holding the rake to its work as it sweeps over the platform to remove the cut stalks of grain therefrom, and a separate camway for guiding the rake-arm when the rake is being returned to repeat the raking operation; sixth, in the combination, with the hinged tubular bearing-piece H, of the slotted pieces 4 4 and adjusting-screws 5 5, for the purposes hereinafter stated; seventh, the combination, with the rake-head-guiding arm, of two rolls, arranged in relation to each other, as hereinafter explained; eighth, the combination, with the rake-head-supporting arm, of a spur or rod, substantially as hereinafter explained; ninth, in the combination and relative arrangement of the rake-head arm and its spur with the arm G *h*, connection *f*, and crank, clutch, and lever devices, as and for the purposes hereinafter shown and described; tenth, the combination, with the quadrant-shaped platform, of an automatic rake and an adjustable guard-finger, substantially as hereinafter described.

In the drawings, the part lettered A is the finger-beam, connected at its outer end to the piece B, and at its heel end to the piece B′, by a lap-joint. The piece B is connected to the front ends of the pieces C C′, which in turn are united at their rear ends by the piece C″. The rear ends of the pieces B and C C′ are connected by the angular pieces $a$ $a^1$, the whole forming or constituting the main frame.

The shaft of the main supporting-wheel D has its bearings on the pieces C C′, while the outer end of the frame is supported by a grain-wheel, D′, the journal of which is supported from the end piece, B, in such a manner that it runs upon the ground inside of the standing grain or grass. The front of the frame, together with the cutting apparatus, which latter may be made and operated from gearing combined with the main wheel D in the usual manner, is supported from the taper frame E by means of the forked standard E′, the forks of the standard being hinged to the piece B′, while the single and upper end passes through a slot in a cross-piece in frame E, and is provided with a series of holes to receive a supporting-pin, $a^2$, whereby the height of the cutting apparatus can be adjusted to cut stubble of any desired height. The front of frame E is supported by a truck-frame, as shown in the drawings. Upon its front end is also supported the driver's seat E″.

The grain-platform F, which is made in the form of a segment of a circle, is supported on bars F′ F′, the front ends of which are hinged to the rear of the finger-beam, while the rear ends are suspended from the angular piece $a^1$ by adjustable bolts or rods *b b′*, provided with nuts at their upper ends, whereby the rear of the platform can be adjusted up and down at pleasure. The bars F′ F′ are provided with eyes at their front ends, so that they can be slipped upon the right-angled hooks in the finger-beam, as indicated in dotted lines and in full lines in the drawings, whereby the platform can be slipped off laterally from said hooks and easily removed when the machine is to be used for cutting grass.

To the shaft of the main wheel is secured a clutch-hub, *c*, to act, when desired, upon the loose clutch *d*, connected to the crank *e* on the end of the main supporting-shaft. To the crank *e* one end of a connecting-rod, *f*, is attached by a double joint, the other end of the rod being connected by a universal joint, *g*, to the rear bent and forked end, *h*, of the arm G, which passes through and is secured in the upper end of the spindle or arbor G′, fitted to turn freely in socket H, which is suspended by journals or trunnions 2 2, having their bearings in the upper ends of the overhanging stands 3 3 on the frame-piece B′.

The lower end of the socket or tubular bearing H is fitted to work between slotted pieces 4 4, through which set-screws 5 5 are inserted, and by means of which the socket can be secured in a vertical or in a more or less inclined position, as circumstances may require. This adjustment of the socket will be fully understood by reference to the several figures.

The bent end *h* of arm G is curved down, so that its jointed end stands in the same horizontal plane, or nearly so, as the journals or trunnions 2 2 of the socket H.

The straight portion of the arm G has two short arms, *k k′*, projecting from it at right angles, one of which, *k′*, may be cast with the arm, or permanently attached to it in any proper way. The rear ends of arms *k k′* serve as supports or bearings for the bent shaft I, which is fitted to turn freely in the bearings in said arms, and has attached to its outer end, which is its lower end, a rake, I′, of ordinary construction. The rake I′ is of sufficient length to extend to the ledge or fender *m* on the outer edge of the platform, or as near as may be without coming in contact with it.

From the outer side of the arm *k* projects a collar, *n*, upon which is secured a bar or rod, J, by means of a set-screw, *n′*. To the outer end of the bar or rod J is fastened the grain, gavel, or separating finger or rod J′, which is about equal in length to the rake, and is parallel with it. By turning the bar J on its axis or journal the grain-supporting finger J′ can be adjusted above the rake at a greater or less height, as occasion may require, to suit the different heights of grain to be cut. It will also be observed that the grain-supporting rod or finger J′ is moved in the arc of a circle when it is adjusted, the center of which is the axis of motion of the bar or rod. J, by which it is supported, and which axis of motion is parallel with the upper side of the platform and at right angles to the line of motion of the machine when the grain-guard is in position for supporting the falling grain at the commencement of the movement of the grain from the platform to form a gavel. (See Fig. 2.)

On the shaft I, between the arms *k k′*, is arranged a projecting spur or rod, *o*, the same being secured upon said shaft by a set-screw, $o^1$. A pendent rod or arm, *p*, is also attached in the same manner to the shaft I, upon the inside of the spur or dog *o*, by means of a set-screw, $o^2$. The lower end of the rod or arm *p* is divaricated, and the branches or forks are provided with small journals, upon which are arranged friction-rolls 6 and 7, as represented in the drawings.

To the socket or tubular bearing piece H a projecting plate, K, of segment form, is attached, the ends 8 8 of which are curved upward, while to the upper part of said plate is secured an elevated curved flange or camway, *s*, and just below said flange or camway a laterally-projecting rib, 9, is secured thereto. Said parts may be made separately or cast in one piece, as preferred.

A clutch-lever, *d′*, is pivoted to the piece C′, its inner forked end working in a groove cut in the clutch-hub *d*, while its outer end is connected by a rod, *e′*, to the lower end of a lever, A′, which is hinged to one of the side pieces which support the driver's seat E″, the upper end of said lever extending up by the driver's seat in a convenient position to be operated by the driver, when desired, for throwing clutch *d* in and out of action with clutch *c*, to put the grain-discharging mechanism into operation, and for interposing the guard or grain-separating finger between the falling grain and that which has been deposited upon the platform.

It will be observed that the projecting rib 9 serves a very important function, since, in combination with the short projecting guide-arm with its roll upon the bent or crooked rake-head-supporting arm, to which the rake-head is rigidly attached, it renders the horizontal action or motion of the rake sure and uniform as it sweeps over the platform to discharge the cut grain in gavels upon the ground.

The operation of the automatic rake is as follows: As the machine is drawn along the crank *e*, when its hub is in clutch with the hub *c*, will be turned, thus giving a back-and-forth motion to the connecting-piece *f*, which in turn will impart a rocking motion to the rake spindle or arbor G′ and its bar G, thereby causing the rake to traverse back and forth over the platform F. As the rake moves forward it is elevated above the platform and the stalks of grain thereon, in consequence of the roller 6 passing over the elevated flange or camway *s*. As the inner surface of the camway *s* is more abrupt than the outer surface, the rake commences to descend as soon as the roller 6 passes the highest point until it reaches the end 10 of the camway, when it drops therefrom, the rake falling at the same time by its own gravity into the cut grain lying upon the platform. As the rake moves backward the cut stalks of grain lying upon the platform are carried back with it and discharged from the platform upon the ground through the open space L. During said operation the friction-roller 7 runs upon the plate K, while the roller 6 runs in contact with the under side of the flange or rib 9, thus retaining the rake in proper position, and preventing the casual raising of the same and the dragging of the teeth too heavily upon the platform. Just after the rake has been moved back sufficiently far to remove the grain from the platform, and before its forward motion commences again, the end of the spur *o* is struck or forced down by the rear end of the connection *f*, which is then descending, thereby turning or canting up shaft I, so that the roller 6 will pass above the end 11 of the irregular camway *s*, thus elevating the rake above the platform and the grain thereon during its forward movement, and at the same time throwing the weight thereof upon the friction-roll 6, which runs upon the camway *s* during the forward movement of the rake.

By this arrangement but little power, comparatively, is required to operate the rake, while the mechanism is simple and not liable to become deranged in use. The grain-guard or separating-finger J′ prevents the falling grain from falling on the rake or upon the grain which is being discharged from the platform, and is supported by a single bar or rod, the journal of which is located over or near the inner front corner of the platform. By adjusting said finger-supporting bar or rod upon its axis the grain-separating finger or rod can be raised and lowered parallel with the surfaces of the upper sides of the finger-beam and platform for supporting stalks of grain of different heights, as occasion may require.

It will be observed that the rake arbor or spindle G′ is arranged or placed at a point which is the center of a circle, of which the quadrant platform F is a part, and that said arbor is in front of the driving and supporting wheel D and near the line of the sickle, and also nearly in line with the rake when the latter commences its back movement at the front end of the platform to sweep the cut grain therefrom to form a gavel.

By this arrangement the rake performs the movement of a quarter-circle without coming in contact with the grain-wheel D′—a contingency which would occur in all other modes of arrangement prior to said ESTERLY'S invention unless the grain-wheel was placed outside the line of cut of the sickle to allow room for the sweep of the rake, and in this case it could not be allowed to extend to the extreme end of the sickle without crowding the grain-wheel too far into the standing grain, and this is a serious objection to all automatic rakes, which sweep the grain from the platform on a quarter-circle when the fulcrum of the rake is near the center of the driving-wheel.

There is not only the difficulty of working the rake in the outside corner of the platform of the machine and striking the grain-wheel, but the platform must be lengthened in proportion as the fulcrum is moved back from the finger-beam, which makes the machine more cumbersome and much more difficult to manage. Besides, when the grain-wheel is thus thrown beyond the cut of the sickle it cannot be used in mowing grass, as it would in such case run upon and roll down the uncut grass: consequently a separate attachment must be added at considerable additional cost.

The shaft I, being placed back of the arbor or rake-spindle G′, allows room to make a sufficient bend in the shaft for raising the rake the required height to clear the grain upon the platform. As the rake-shaft is so connected that it moves with the spindle or arbor G′, it describes the circle (so far as the rake is concerned) that it would if the rake was directly connected with the spindle or arbor G′, thus securing the advantages resulting from having the spindle or arbor G′ in line, or nearly so, with the sickle-bar, and the rake-shaft sufficiently far back to admit of the required elevation of the rake when moving forward.

The driver can regulate at will the size of the gavel by simply operating the clutch device *d c* by means of lever A′, as the operation of the rake is governed thereby.

By having the universal joint *g* in the same plane with the journals or trunnions of the socket-piece H, the latter may be adjusted in a more or less inclined position to regulate the height of the rake without affecting the connecting-rod *f*, as regards length—that is to say, one connecting-rod only will be required in all cases.

If the aforesaid parts were differently disposed connecting-rods of different lengths would be required.

The socket or bearing piece H is adjusted to regulate the movement of the rake, so that it may work in a position to suit the height the grain is being cut, and as the plate K moves with the socket-piece the trip or dog *o* requires to be adjusted to suit the position of the plate K.

It will also be seen that the platform F must be adjusted by turning the nut upon the upper end of the rods *b b* to suit the position of the other parts.

The bars or pieces *a* $a^1$ are placed in oblique positions, in order to allow room for the rake to pass or perform its necessary movements without extending back the side pieces, B C, sufficiently far to accomplish the object.

The latter mode of construction would not only render the machine more cumbersome, but also weaker. The weight of the rear part of the machine would also be increased, thus rendering additional weight in front necessary, in order to balance the machine.

Other parts of said GEORGE ESTERLY'S combined automatic rake and harvester are described more fully in another division of reissue of even date herewith.

Having described that part of the said invention which forms the subject-matter of this division of reissue, what is claimed as the invention of the said GEORGE ESTERLY, and desired to have secured by Letters Patent, is—

1. The combination, with the bent or crooked arm which is attached to, supports, and carries the head of the rake-teeth in an automatic-raking harvester, of a short downwardly-projecting arm, *p*, provided with a roll, 6, and a stationary projecting rib, 9, for holding the rake to the platform while the cut stalks of grain are moved therefrom to form a gavel.

2. The combination, with a grain-platform adjustable independently of the finger-beam, of an adjustable automatic rake, substantially as and for the purposes set forth.

3. The combination, with the bent arm G *h*, arranged in respect to journals 2 2 as described, of a double-hinged connection-piece, *f*, for operating the same, and arranged in respect to the main driving-wheel substantially as and for the purposes set forth.

4. The combination, with the spindle or arbor which supports the rake, and by which it is moved back and forth over the platform, of an adjustable socket or bearing piece, substantially as and for the purposes set forth.

5. The combination, with the bent or crooked arm which supports the rake head and teeth, in an automatic-raking harvester, of a short projecting guide-arm, *p*, a horizontally-projecting rib, 9, for holding the rake to its work as it sweeps over the platform to remove the cut stalks of grain therefrom, and a separate camway for guiding the rake-arm when the rake is being returned to repeat the raking operation.

6. The combination, with the hinged tubular bearing-piece H, of the slotted pieces 4 4 and adjusting-screws 5 5, for the purposes stated.

7. The combination, with the rake-head-guiding arm, of two friction-rolls, arranged in relation to each other, substantially as shown and described.

8. The combination, with the rake-head-supporting arm, of a spur or rod, *o*, and connection *f*, substantially as and for the purposes set forth.

9. The combination and relative arrangement of the rake-head arm and its spur with the arm G *h*, connection *f*, and crank, clutch, and lever devices, as and for the purposes shown and described.

10. The combination, with the quadrant-shaped platform, of an automatic rake and an adjustable guard-finger, substantially as described.

JOHN F. SEIBERLING.

Witnesses:

MILTIEN MOORE,

S. B. MEARY.